United States Patent
Kato (10) Patent No.: US 6,707,785 B1
(45) Date of Patent: Mar. 16, 2004

(54) OPTICALLY RECORDING MEDIUM HAVING DIFFERENTLY-SHAPED PRE-PITS FORMED RESPECTIVELY IN FIRST AND SECOND REGIONS OF A RECORD SURFACE, AND APPARATUS FOR AND METHOD OF MANUFACTURING THE SAME

(75) Inventor: Masahiro Kato, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/951,476

(22) Filed: Sep. 14, 2001

(30) Foreign Application Priority Data

Sep. 14, 2000 (JP) ........................................ 2000-279280

(51) Int. Cl.$^7$ ................................................ G11B 7/24
(52) U.S. Cl. ................................. 369/275.3; 369/275.4
(58) Field of Search ............................. 369/275.3, 275.4

(56) References Cited

U.S. PATENT DOCUMENTS

| | | | | |
|---|---|---|---|---|
| 5,341,362 A | * | 8/1994 | Fujii et al. | 369/275.4 |
| 5,448,552 A | * | 9/1995 | Onagi | 369/275.4 |
| 5,754,523 A | * | 5/1998 | Deguchi et al. | 369/275.4 |
| 5,963,536 A | | 10/1999 | Vasic et al. | |
| 6,181,672 B1 | * | 1/2001 | Muramatsu et al. | 369/275.4 |
| 6,421,313 B1 | * | 7/2002 | Belser | 369/275.4 X |
| 6,477,136 B2 | * | 11/2002 | Sakurai et al. | 369/275.4 |
| 6,487,149 B1 | * | 11/2002 | Yokoi et al. | 369/47.25 |
| 6,519,214 B1 | * | 2/2003 | Hikima | 369/44.26 |
| 6,545,972 B1 | * | 4/2003 | Kato et al. | 369/124.12 |

FOREIGN PATENT DOCUMENTS

| | | |
|---|---|---|
| EP | 0 893 793 A2 | 1/1999 |
| EP | 1 022 729 A2 | 7/2000 |
| EP | 1 031 975 A2 | 8/2000 |
| JP | 2000-132868 | 5/2000 |

OTHER PUBLICATIONS

Abstract JP 2000–132868.
"The Dynamic", IEEE Spectrum, Oct. 1999, vol. 36, No. 10, pp. 28–35.

* cited by examiner

Primary Examiner—Aristotelis M Psitos
(74) Attorney, Agent, or Firm—Morgan, Lewis & Bockius LLP (57) ABSTRACT

The optically recording medium (10, 60, 70) is provided with: groove tracks (11), on which the record information is recorded in a first region and on which the predetermined data is recorded as an embossed pit row (19) in a second region so as to prevent another data overwritten on the embossed pit row from being read out; a land track (12) formed in the first region and the second region between the groove tracks adjacent to each other; and pre-pits (13, 45, 46, 48) arranged on the land track in the first region and the second region and including address information. The pre-pit (45, 46) in the second region is formed in a shape different from that (13, 47) in the first region such that a larger amplitude of a pre-pit detection signal corresponding to the pre-pit is obtained in the second region

18 Claims, 10 Drawing Sheets

OPTICALLY RECORDING MEDIUM HAVING DIFFERENTLY-SHAPED PRE-PITS FORMED RESPECTIVELY IN FIRST AND SECOND REGIONS OF A RECORD SURFACE, AND APPARATUS FOR AND METHOD OF MANUFACTURING THE SAME

BACKGROUND OF THE INVENTION

1. Field of the Invention

The present invention relates to an optically recording medium, on which information can be optically recorded, and an apparatus for and a method of manufacturing the same.

2. Description of the Related Art

A DVD-RW (DVD-Re-recordable) disc is well known as an optically recording medium, on which information can be optically recorded. Such an optically recording medium is provided with: a groove track on which the record information is recorded; and land pre-pits (hereafter, merely referred to as "pre-pits")indicating various information, such as addresses and the like, each formed on a land track between adjacent turns of the groove track. The groove track has: a first region in which the record information is recorded; and a second region in which a predetermined data is formed as an embossed pit row to thereby prevent another data overwritten on the embossed pit row from being read out.

A reproducing apparatus for reproducing the record information from such an optically recording medium is designed such that a light spot is irradiated onto the groove track, a reflection light reflected on a reflection layer is detected by a light detector PD, and the recorded record information is accordingly read in. The size of this light spot is designed such that a part thereof is also irradiated onto the pre-pit formed adjacent to the groove track. Then, the reflection light from the disc is detected by the light detector PD to thereby read in the record information recorded on the groove and the various information such as the addresses and the like on the land track. However, the pre-pit formed on the land track in the first region is positioned close to the groove track. Thus, the pre-pit formed in the first region has a bad influence on an operation for reading a reproduction signal of the record information recorded on the groove track. So, this applicant has proposed the shape of the pre-pit that can minimize such a bad influence, in Japanese Patent Application Laid Open No. 2000-132868.

However, the groove track of the optically recording medium also includes the second region in which the embossed pit row is recorded. As described in the above-mentioned gazette, if the shape of the pre-pit in the first region is optimized so as to minimize the influence of the pre-pit on the reproduction signal, this optimization results in a problem that it is difficult to satisfy a required value of an aperture ratio ARe (i.e., ARe>30%) of the pre-pit detection signal in the second region where the embossed pit row is formed, which is prescribed by a DVD-RW format. The aperture ratio ARe implies the ratio of a minimum amplitude APmin with respect to a maximum amplitude APmax in a pre-pit detection signal.

SUMMARY OF THE INVENTION

The present invention is proposed in view of the above mentioned problems. It is therefore an object of the present invention to provide an optically recording medium in which the pre-pit formed in the first region hardly has the bad influence on the reproduction signal, and it is possible to easily satisfy the required value of the aperture ratio of the pre-pit detection signal in the second region, and an apparatus for and a method of manufacturing the same.

The above object of the present invention can be achieved by an optically recording medium on which record information can be optically recorded, provided with: a substrate; a record surface formed on the substrate and having a first region where the record information is recorded and a second region where predetermined data to control recording and/or reproducing the record information is recorded; groove tracks formed in the first region and the second region, on which the record information is recorded in the first region and on which the predetermined data is recorded as an embossed pit row in the second region so as to prevent another data overwritten on the embossed pit row from being read out; a land track formed in the first region and the second region between the groove tracks adjacent to each other; and pre-pits arranged on the land track in the first region and the second region and including address information, which indicates a record position on the groove track, the pre-pit in the second region being formed in a shape different from that in the first region such that a larger amplitude of a pre-pit detection signal corresponding to the pre-pit is obtained in the second region as compared with that in the first region.

According to the optically recording medium of the present invention, the shape of the pre-pit formed in the second region is different from that in the first region, so as to obtain the larger amplitude of the pre-pit detection signal. Thus, the value of the aperture ratio ARe of the pre-pit detection signal in the second region becomes larger, which can easily satisfy the required value e.g., ARe>30% which is prescribed by a DVD-RW format.

In one aspect of the optically recording medium of the present invention, the pre-pit in the first region is formed so as to minimize an influence of the pre-pit on a reproduction signal corresponding to the record information read out from the groove tracks.

According to this aspect, in the first region the influence of the pre-pit on the reproduction signal can be minimized while, in the second region, the value of the aperture ration ARe can be made certainly large.

In another aspect of the optically recording medium of the present invention, the pre-pit in the second region is formed longer in a scanning direction than the pre-pit in the first region.

According to this aspect, in the second region, it is possible to increase the value of the aperture ration ARe by virtue of the longer pre-pit formed in the second region.

In another aspect of the optically recording medium of the present invention, the pre-pit in the second region is formed deeper than the pre-pit in the first region.

According to this aspect, in the second region, it is possible to increase the value of the aperture ration ARe by virtue of the deeper pre-pit formed in the second region.

In another aspect of the optically recording medium of the present invention, the pre-pit in the second region is formed larger in a disc radial direction than the pre-pit in the first region.

According to this aspect, in the second region, it is possible to increase the value of the aperture ration ARe by virtue of the larger pre-pit formed in the second region.

In another aspect of the optically recording medium of the present invention, the second region is located at an address same as that of a region where reproduction control information of a recording medium dedicated to a reproduction is recorded.

According to this aspect, it is protect an RF (Radio Frequency) copy e.g., an RF copy to a DVD-RW disc from a DVD-ROM disc.

The above object of the present invention can be also achieved by an apparatus for manufacturing an optically recording medium, on which record information can be optically recorded, by using an original disc, provided with: a groove track forming device for forming groove tracks on a surface of the original disc, on which the record information is to be recorded in a first region and on which predetermined data to control recording and/or reproducing the record information is recorded as an embossed pit row in a second region, so as to prevent another data overwritten on the embossed pit row from being read out; and a pre-pit forming device for forming pre-pits arranged on a land track between the groove tracks adjacent to each other in the first region and the second region and including address information, which indicates a record position on the groove track, the pre-pit forming device forming the pre-pit in the second region in a shape different from that in the first region such that a larger amplitude of a pre-pit detection signal corresponding to the pre-pit is obtained in the second region as compared with that in the first region.

According to the manufacturing apparatus of the present invention, the above described optically recording medium of the present invention can be surely and easily manufactured.

In one aspect of the manufacturing apparatus of the present invention, the pre-pit forming device forms the pre-pit in the first region so as to minimize an influence of the pre-pit on a reproduction signal corresponding to the record information read out from the groove tracks.

In another aspect of the manufacturing apparatus of the present invention, the pre-pit forming device forms the pre-pit in the second region longer in a scanning direction than the pre-pit in the first region.

In another aspect of the manufacturing apparatus of the present invention, the pre-pit forming device forms the pre-pit in the second region deeper than the pre-pit in the first region.

In another aspect of the manufacturing apparatus of the present invention, the pre-pit forming device forms the pre-pit in the second region larger in a disc radial direction than the pre-pit in the first region.

In another aspect of the manufacturing apparatus of the present invention, the second region is located at an address same as that of a region where reproduction control information of a recording medium dedicated to a reproduction is recorded.

The above object of the present invention can be also achieved by a method of manufacturing an optically recording medium, on which record information can be optically recorded, by using an original disc, including: a groove track forming process of forming groove tracks on a surface of the original disc, on which the record information is to be recorded in a first region and on which predetermined data to control recording and/or reproducing the record information is recorded as an embossed pit row in a second region, so as to prevent another data overwritten on the embossed pit row from being read out; and a pre-pit forming process of forming pre-pits arranged on a land track between the groove tracks adjacent to each other in the first region and the second region and including address information, which indicates a record position on the groove track, the pre-pit forming process forming the pre-pit in the second region in a shape different from that in the first region such that a larger amplitude of a pre-pit detection signal corresponding to the pre-pit is obtained in the second region as compared with that in the first region.

According to the manufacturing method of the present invention, the above described optically recording medium of the present invention can be surely and easily manufactured.

In one aspect of the manufacturing method of the present invention, the pre-pit forming process forms the pre-pit in the first region so as to minimize an influence of the pre-pit on a reproduction signal corresponding to the record information read out from the groove tracks.

In another aspect of the manufacturing method of the present invention, the pre-pit forming process forms the pre-pit in the second region longer in a scanning direction than the pre-pit in the first region.

In another aspect of the manufacturing method of the present invention, the pre-pit forming process forms the pre-pit in the second region deeper than the pre-pit in the first region.

In another aspect of the manufacturing method of the present invention, the pre-pit forming process forms the pre-pit in the second region larger in a disc radial direction than the pre-pit in the first region.

In another aspect of the manufacturing method of the present invention, the second region is located at an address same as that of a region where reproduction control information of a recording medium dedicated to a reproduction is recorded.

DETAILED DESCRIPTION OF THE PREFERRED EMBODIMENTS

Preferred embodiments of the present invention will be explained below with reference to the drawings.

Before describing the actual preferred embodiments, a comparison example is explained with reference to FIGS. 10A, 10B and 10C, so as to explain the operational principle and advantageous effect of the preferred embodiments.

Figure 10A:
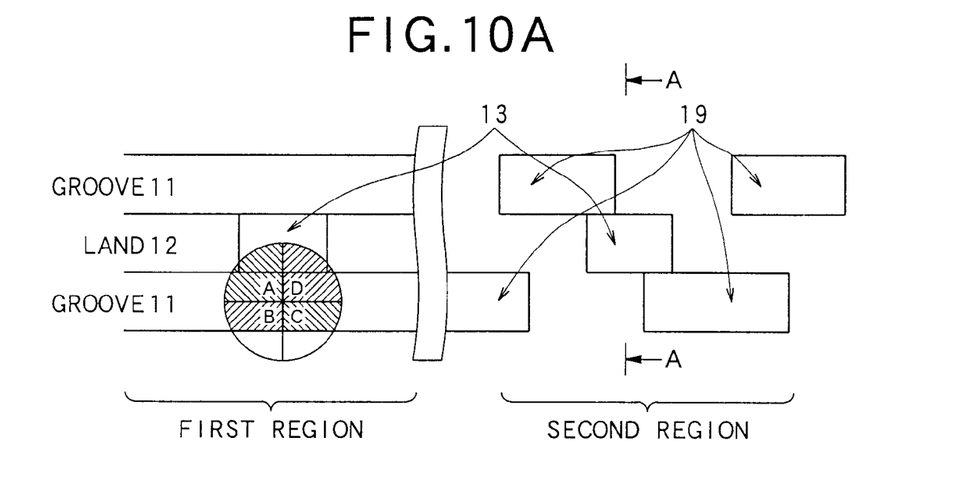
FIGS. 10A, 10B and 10C are diagrams schematically showing a groove track and a land pre-pit of a control data section in a comparison example.

FIG. 10A is an enlarged view showing a main portion of an optically recording medium as the comparison example, and diagrammatically illustrates (i) the shapes of groove tracks 11 and pre-pits 13 formed on a land track 12 in a first region serving as a data area, and (ii) the shapes of embossed pit rows 19 and pre-pits 13 in the second region serving as a control data area. Also, FIG. 10A diagrammatically shows the manner when the light spot is irradiated so as to cover the groove track 11 and the pre-pit 13, and the reflection light reflected on the reflection layer of the optically recording medium is detected by the four-divided light detector PD. On the other hand, FIG. 10B shows a later-described pre-pit detection signal, and FIG. 10C shows a sectional view taken on the line A—A in FIG. 10A.

As shown in FIG. 10A, in the comparison example, the pre-pits 13 have the same shapes in the first region and the second region so as to minimize the influence on the reproduction signal, irrespectively of the region. When the light spot is located at the position of the radiation to the pre-pit 13, in four light reception elements A, B, C and D constituting the light detector PD, the optical diffraction phenomenon resulting from the groove track 11 and the pre-pit 13 causes the light amounts appearing on the light reception elements A and D to be decreased, and the light amounts appearing on the light reception elements B and C to be increased. Thus, typically, the output signals $S_A$, $S_D$, $S_B$ and $S_C$ of the respective light reception elements A, B, C and D of the light detector PD are added and subtracted, such as $(S_A+S_D)-(S_B+S_C)$, and accordingly used as the pre-pit detection signal.

Figure 10B:
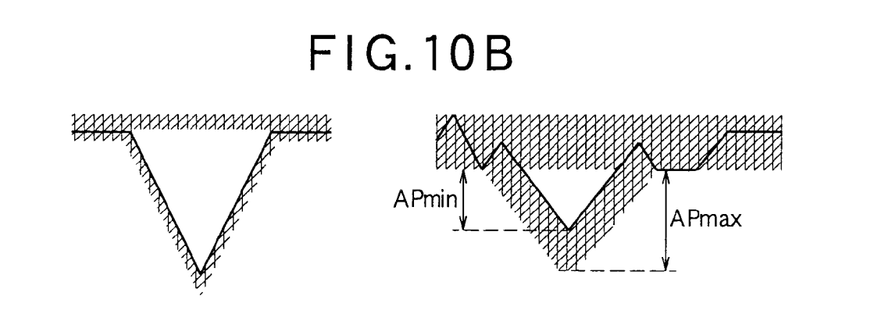
Figure 10C:
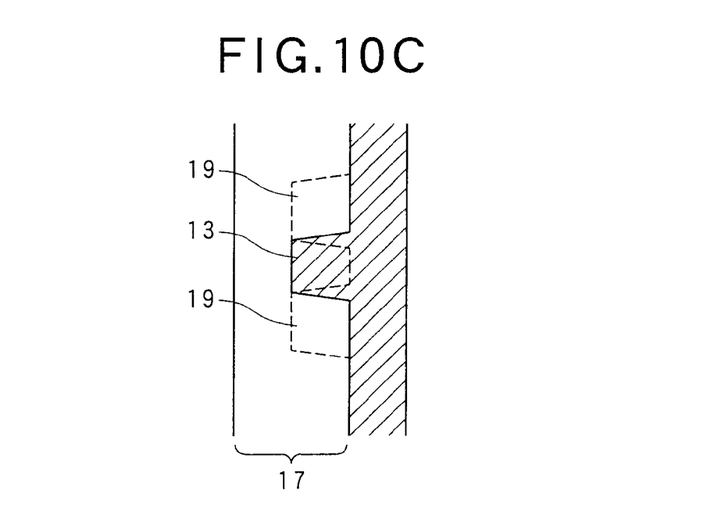

The pre-pit detection signal in the first region is changed as shown in a wave form view on a left side of FIG. 10B. That is, when the light spot is located on the groove track 11, the light reception amounts of the respective light reception elements A, B, C and D in the light detector PD are substantially equal to each other, and the pre-pit detection signal is slightly changed because of a noise component at a predetermined level. Then, when the light spot is located at a position of a radiation to the groove track 11 and the pre-pit 13, the detection signals of the respective light reception elements of the light detector PD have the relation of $(S_A+S_D)<(S_B+S_C)$. So, the pre-pit detection signal is changed toward a minus side in a V-shaped manner.

On the other hand, the pre-pit detection signal in the second region is changed as shown in a wave form view on a right side of FIG. 10B. When the light spot is located on the embossed pit row 19, the pre-pit detection signal is modulated by the embossed pit row 19 at a predetermined level. Then, when the light spot is located at a position of irradiating the pre-pit 13 and the embossed pit row 19, the detection signals of the respective light reception elements of the light detector PD have the relation of $(S_A+S_D)<(S_B+S_C)$. So, the pre-pit detection signal is changed toward the minus side in the V-shaped manner while receiving the modulation caused by the embossed pit row 19. The above-mentioned aperture ratio ARe implies the ratio of a minimum amplitude APmin with respect to a maximum amplitude APmax in this pre-pit detection signal. The value of 30% or more is required in accordance with the DVD-RW format.

As mentioned above, the pre-pit detection signal severely receives the modulation caused by the embossed pit row 19 in the second region. So, if the pre-pit is formed by considering the bad influence on the reproduction signal in the first region, both of the minimum amplitude APmin and the maximum amplitude APmax become low. Consequently, it is difficult to satisfy a required value of the aperture ratio ARe (i.e., ARe>30%) of the pre-pit detection signal in the second region where the embossed pit row 19 is formed, which is prescribed by a DVD-RW format.

Figure 1:
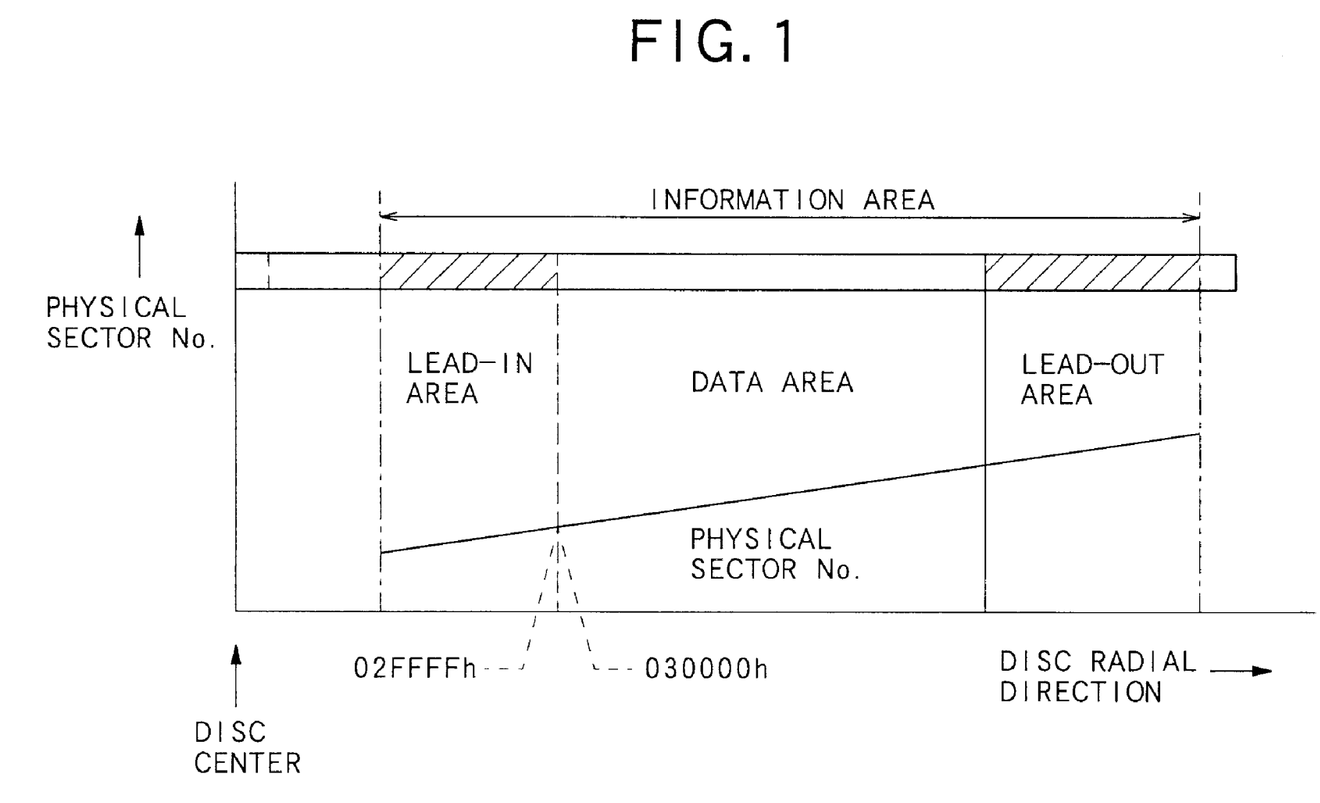
FIG. 1 is a diagram showing a layout of a physical sector in a radius direction on a record surface of an optically recording medium used in embodiments of the present invention.

FIG. 1 is a diagram showing a layout of a physical sector in a radius direction on a record surface in a DVD-RW 10 (hereafter, referred as an optically recording medium 10). In an information area for recording the record information, a lead-in area, a data area and a lead-out area are formed in that order to an outer side of a radial direction from a start point of the information area (a start point of the physical sector) located at the disc center. The lead-in area is the region which is firstly accessed in recording onto and reproducing from the optically recording medium 10. So, the control data, which is composed of information with regard to the optically recording medium 10, various information with regard to the record data corresponding to a content, and the like, is recorded in the lead-in area. The data area is the region to which a data main body to be recorded is recorded. As this data main body, for example, there may be video data, audio data, and data or a program that can be read by a computer, or the like. The lead-out area is the region, to which zero data to indicate an end position of the data area is recorded.

Figure 2:
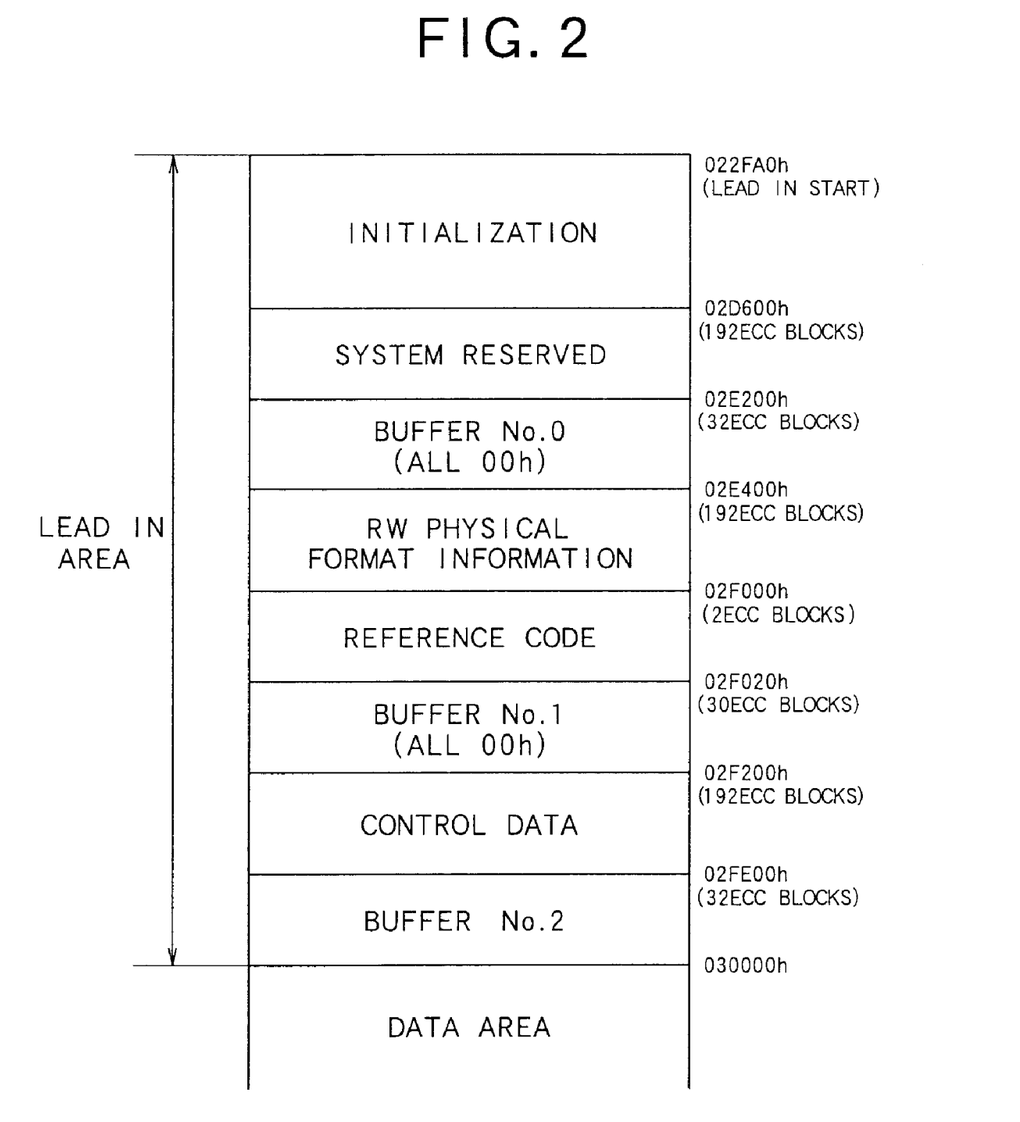
FIG. 2 is a diagram showing a configuration of a lead-in area and a control data area of the optically recording medium used in the embodiments.

FIG. 2 shows the lead-in area in detail. The lead-in area contains the data, such as a reference code, a control data and the like. According to the DVD-RW format, the control data important for a recording and reproducing control is written to an RW physical format information zone by a phase change pit. On the other hand, an embossed pit row composed of the zero data, to which an 8–16 modulation has been applied, is formed in advance in the control data area located at the same address as the control data area in the DVD-ROM serving as a record medium dedicated to a reproduction, in order to prevent the control data from being recorded onto and reproduced from this region (accurately, in order to prevent the data overwritten onto this region from being read out). This is intended to protect an RF copy to a DVD-RW disc from a DVD-ROM disc Hereafter, the data area in which the record information is recorded is referred to as a "first region", and the control data area in which the embossed pit row is formed is referred to as a "second region".

Figure 3:
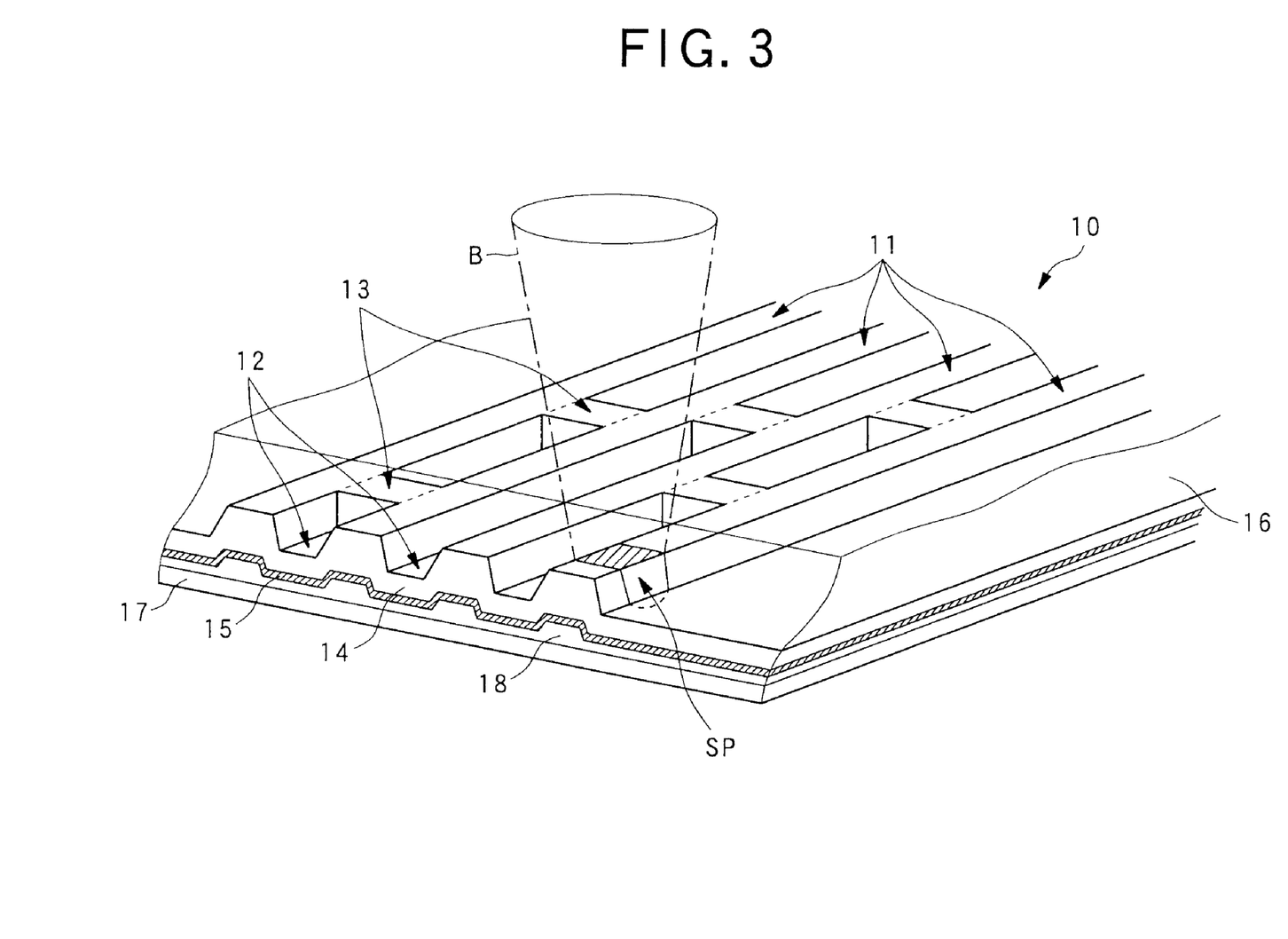
FIG. 3 is a perspective view showing a structure of the record surface of the optically recording medium used in the embodiments.

FIG. 3 is a perspective view showing the structure of the record surface of the optically recording medium 10. In FIG. 3, the optically recording medium 10 is the optically recording medium of a phase change type, which has a multi-layer 14 comprising: a record layer made of phase change material (for example, GeSbTe and the like) as a data record layer; and protective layers of glass substance ($ZnS$—$SiO_2$) sandwiching this record layer, and in which the record information can be re-written. In the optically recording medium 10, there are formed groove tracks 11 serving as information record tracks and land tracks 12 for guiding and introducing a light beam B as a reproduction light or a record light to the groove tracks 11. Also, the optically recording medium 10 has a reflection layer 15 for reflecting the light beam B when the recorded data is reproduced, and an adhesive layer 18 through which they are adhered to a transparent substrate (poly-carbonate) 17.

A transparent film (poly-carbonate) 16 for protecting an input side of the light beam B is placed thereon.

The groove track 11 is a concave portion of the transparent film 16, so that it is called as the "groove" track while it is convex with respect to the irradiation side of the light beam B. The land track 12 is a convex portion of the transparent film 16, so that it is called as the "land" track while it is concave with respect to the irradiation side of the light beam 3.

A pre-pit 13 corresponding to pre-information (i.e., pre-record information) is formed on the land track 12. This pre-pit 13 is responsible for the pre-information used in the recording and reproducing operation in a recording and reproducing apparatus for recording onto and reproducing from the optically recording medium 10, namely, it is responsible for the address information to recognize a position on the groove track 11, and the synchronization information. The pre-pit 13 is formed in advance before the shipment of the optically recording medium 10. Also, the groove track 11 is wobbled at a frequency corresponding to a rotational speed of the optically recording medium 10. This wobbled groove track 11 is formed in advance before the shipment of the optically recording medium 10, similarly to the pre-pit 13.

When the record information (implying the record information, such as picture information and the like, to be primarily recorded except the pre-information) is to be recorded onto the optically recording medium 10, a wobbling frequency of the groove track 11 is extracted to accordingly perform a rotational control for the optically recording medium 10 at a predetermined rotational speed. Then, the pre-pit 13 is detected to thereby obtain the pre-information in advance, so that the optimal output of the light beam B serving as the record light and the like are set on the basis of this pre-information. Also, the address information indicating a position on the optically recording medium 10 on which the record information is recorded and the like are obtained. Then, the record information is recorded onto the corresponding record position, in accordance with this address information.

Next, the record format of the pre-information recorded in advance on the optically recording medium 10 will be described below with reference to FIG. 4.

Figure 4:
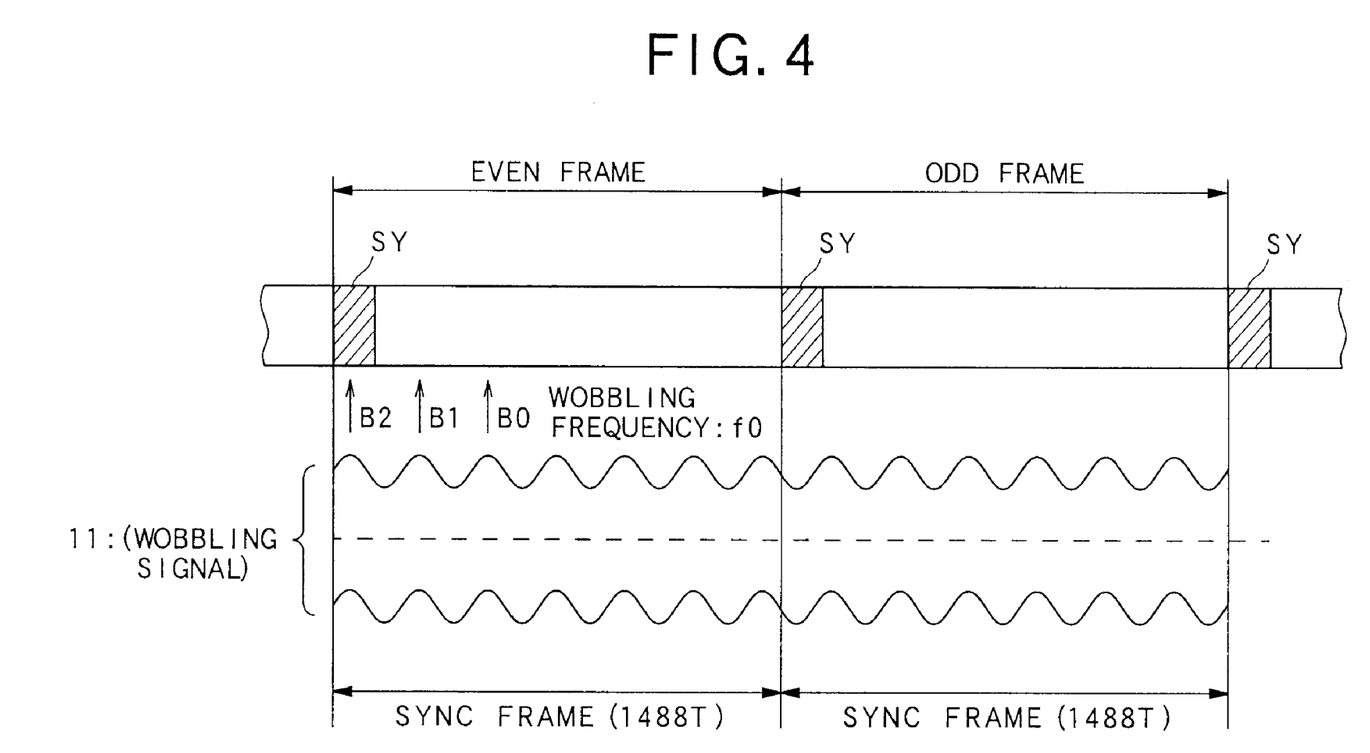
FIG. 4 is a diagram used to describe a pre-pit and a frame structure of the physical sector of the optically recording medium used in the embodiments.

In FIG. 4, the top stage indicates the record format in the record information. The wave form on the bottom two stage indicates the wobbling state of the groove track 11 for recording the record information (which corresponds to a plan view of the groove track 11). And, the upward arrow between the wobbling state of the groove track 11 and the record information grammatically indicates a position at which the pre-pit 13 is formed. Here, in FIG. 4, the wobbling state of the groove track 11 is indicated by using an amplitude larger than an actual amplitude, for the easy understanding. The record information is recorded on a central line of the groove track 11.

As shown in FIG. 4, the record information to be recorded onto the optically recording medium 10 is divided into each synchronization frame serving as an information unit in advance. Then, one recording sector is constituted by 26 synchronization frames. Moreover, one ECC (Error Correction Code) block is constituted by 16 recording sectors. By the way, one synchronization frame has a length equal to 1488 times (1488T) of a channel bit length (hereafter, referred to as T) defined by the record format when the record information is recorded. Moreover, the portion corresponding to a length of a lead 32T of one synchronization frame is used as a synchronization information SY to accomplish a synchronization for each synchronization frame.

On the other hand, the pre-information recorded on the optically recording medium 10 is recorded for each synchronization frame. Here, in case that the pre-information is recorded on the optically recording medium 10 by virtue of the pre-pits 13, one pre-pit 13 indicating a synchronization signal in the pre-information is always formed on the land track 12 adjacent to a region were the synchronization information SY in each synchronization frame in the record information is recorded. Also, in this case, one or two pre-pits 13 indicating the content of the pre-information to be recorded are formed on the land track 12 adjacent to the former portion within the synchronization frame other than the synchronization information SY (as for the former portion within the synchronization frame other than the synchronization information SY, there may be a case that the pre-pit 13 is not formed depending on the content of the pre-information to be recorded).

Usually, the pre-pits 13 are formed only in the even-numbered synchronization frames (hereafter, referred to as EVEN frames), and the pre-information is recorded. That is, in FIG. 4, the pre-pits 13 are formed in the EVEN frames (indicated by the upward arrows on the solid line in FIG. 4). On the other hand, the pre-pits 13 are not formed in the ODD frames adjacent to them. In detail, in case that the pre-pits are formed in the EVEN frames, all the pre-pits 13 (which are defined as pre-pits B2, B1 and B0, wherein they are located in the order of the pre-pits B2, B1 and B0 from the lead of the ynchronization frame) are formed in the synchronization frame of the lead of the recording sector. In the synchronization frames except the lead of the recording sector, the pre-pits B2 and B0 are formed when the pre-information to be recorded in the synchronization frame is at "1", while only the pre-pit B2 is formed when the pre-information to be recorded is at "0".

Also, in case that the pre-pits are formed in the ODD frames, in the synchronization frame of the lead of the recording sector, the pre-pits B2 and B1 are formed, and the synchronization frames except the lead of the recording sector are similar to the case of the EVEN frames. That is, the pre-pit 13 has the different meaning depending on the pattern of the pre-pit rows B2, B1 or B0.

By the way, the synchronization frame of the EVEN frame or the ODD frame in which the pre-pit 13 is formed is determined depending on the position of the pre-pit 13 previously formed on the adjacent land track 12. That is, the pre-pit 13 is usually formed in the EVEN frame. However, when the pre-pit 13 is formed in the EVEN frame, if it is close to the pre-pit 13 on the previously formed adjacent land track 12 in the radial direction of the optically recording medium 10, the pre-pit 13 is formed in the ODD frame. Such formation disables the pre-pit 13 to exist at the position of the adjacent land track 12. Thus, the influence caused by cross talk can be reduced upon detecting the pre-pit 13.

On the other hand, the groove track 11 is wobbled at a constant wobbling frequency f0 (i.e., a frequency in which a wobble signal corresponding to 8 waves is included within one synchronization frame) of about 140 kHz over all the synchronization frames. Then, in the recording and reproducing apparatus, this constant wobbling frequency f0 is extracted to thereby detect a signal for a rotational control of a spindle motor and accordingly generate a record clock signal.

Next, the schematic configuration of an apparatus 50 for manufacturing an optically recording medium, which produces an optically recording medium disc 40 will be described below with reference to a block diagram shown in FIG. 5.

Figure 5:
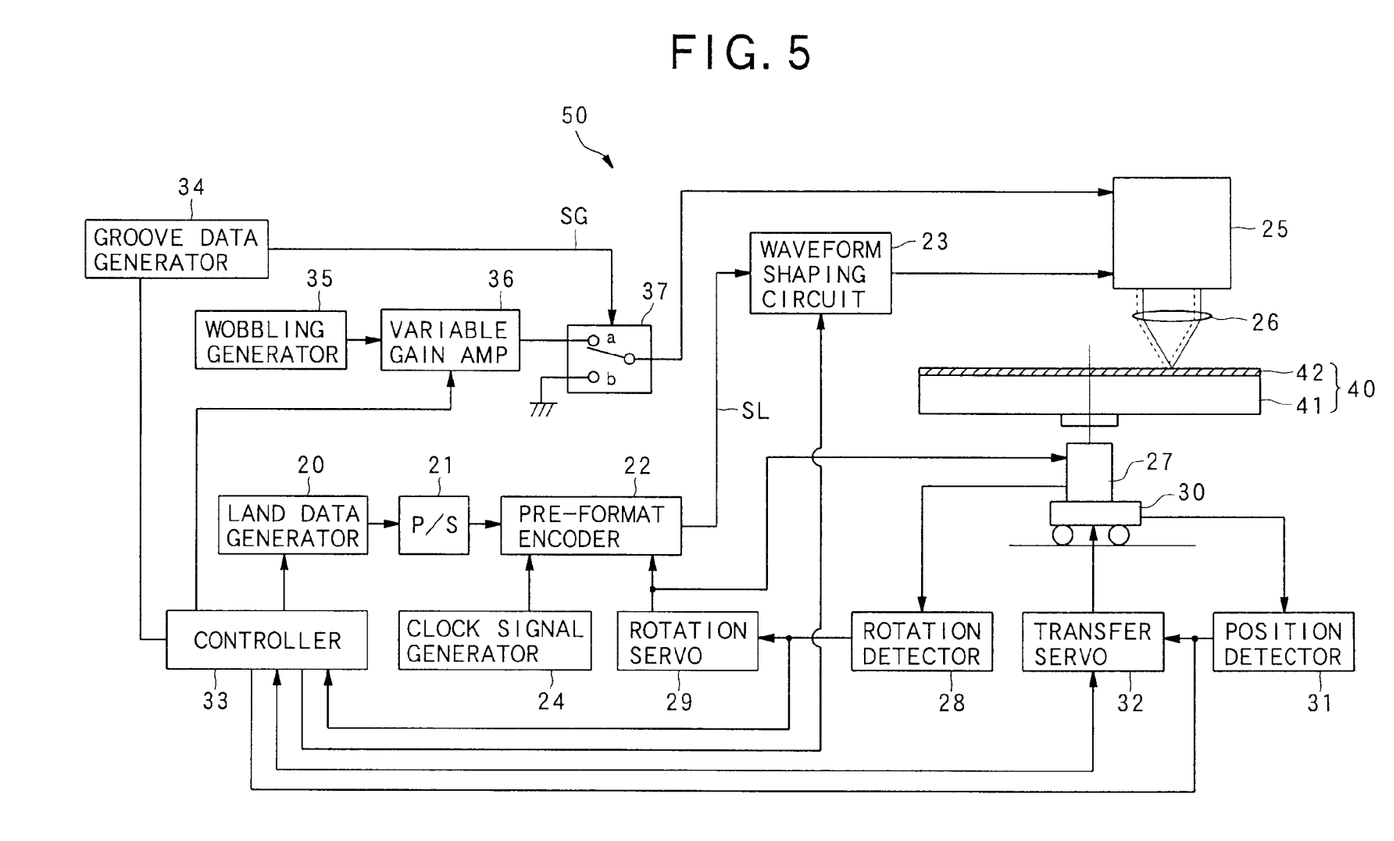
FIG. 5 is a block diagram showing a schematic configuration of an apparatus for manufacturing the optically recording medium in the embodiments.

In FIG. 5, the apparatus 50 for manufacturing an optically recording medium is provided with a land data generator 20, a parallel/serial converter (P/S) 21, a pre-format encoder 22, a waveform shaping circuit 23, a clock signal generator 24, a light beam generator 25, an objective lens 26, a spindle motor 27, a rotation detector 28, a rotation servo circuit 29, a transferring unit 30, a position detector 31, a transfer servo circuit 32, a controller 33, a groove data generator 34, a wobbling signal generator 35, a variable gain amplifier 36 and a switch 37.

The optically recording medium disc 40 is provided with a glass substrate 41 and a resist layer 42 coated on this glass substrate 41. The resist layer 42 is exposed by a light when a light beam is irradiated as described later. Then, an etching process is performed thereon. Accordingly a pit is formed which has a shape corresponding to a change of a strength of the light beam.

In FIG. 5, the land data generator 20 outputs a parallel data corresponding to the pre-pit 13 formed on the land track 12, under the control of the controller 33. The output parallel data is converted into a serial data by the parallel/serial converter 21. Then, this serial data is inputted to the pre-format encoder 22. A pre-pit formation signal SL to actually form the pre-pit 13 on the optically recording medium disc 40 is generated on the basis of a pre-formatting clock signal sent from the clock signal generator 24, and outputted it through the waveform shaping circuit 23 to the light beam generator 25.

The waveform shaping circuit 23 varies a pulse width of the pre-pit formation signal SL outputted from the pre-format encoder 22, on the basis of a control signal of the controller 33 in order to actually form the pre-pit 13 on the optically recording medium disc 40, and outputs it. For example, if the pre-pit 13 is formed in the first region, it outputs the pre-pit formation signal SL as it is, in order to form the optimized short pre-pit (hereafter, referred to as a short LPP) so as not to exert any bad influence on the reproduction signal. On the other hand, if the pre-pit 13 is formed in the second region, it widens each pulse width of the pre-pit formation signal SL on the basis of the control signal of the controller 33, in order to form the optimized long pre-pit (hereafter, referred to as a long LPP) so as to increase an amplitude of the pre-pit detection signal, and outputs it.

On the other hand, the groove data generator 34 generates a groove formation signal SG including a record data formed as the embossed pit row and the groove track 11, under the control of the controller 33, and outputs as a control signal with regard to the switch 37. In short, the switch 37 is turned ON/OFF in accordance with an output signal of the groove data generator 34.

The wobbling signal generator 35 generates the wobbling signal in order to give a slight wobbling to the groove track 11. This wobbling signal is outputted to the switch 37 through the variable gain amplifier 36 controlled to a predetermined gain by the controller 33. The wobbling signal and a ground level are inputted to the switch 37, and a switching control is carried out on the basis of the groove data outputted from the groove data generator 34. Accordingly, the groove formation signal SG to actually form the shape of the groove track on the optically recording medium disc 40 is outputted to the light beam generator 25.

The light beam generator 25 outputs to the optically recording medium disc 40 the light beam to form the pre-pit 13 and the groove track 11. The light beam generator 25 is designed so as to irradiate onto the optically recording medium disc 40 the light beam (indicated by the dotted line in FIG. 5) to form the groove track 11 and the light beam (indicated by the solid line in FIG. 5) to form the pre-pit 13, at a predetermined interval (which is an interval between a central line of the groove track 11 to be formed and a central line of the pre-pit 13 to be formed). The light beam to form the groove track 11 is controlled on the basis of the groove formation signal SG. The light beam to form the pre-pit 13 is controlled on the basis of the pre-pit formation signal SL. Both the beams are collected through the objective lens 26 onto the optically recording medium disc 40.

The optically recording medium disc 40 is rotationally driven by the spindle motor 27. The rotation detector 28 detects the rotation of the optically recording medium disc 40. The rotation servo circuit 29 controls the rotation of the spindle motor 27, on the basis of the output of the rotation detector 28.

The position detector 31 detects the position of the transferring unit 30, and outputs the detection signal to the transfer servo circuit 32. The transfer servo circuit 32 obtains the positional information of the transferring unit 30, on the basis of the detection signal from the position detector 31, and controls the movement of the transferring unit 30, in accordance with the obtained positional information.

The portions serving as the continuous grooves, the embossed pit rows and the pre-pits in the optically recording medium disc 40 are exposed by the light beams by the execution of the above-mentioned operations. The optically recording medium disc 40 serving as the cutting die to manufacture the optically recording medium 10 is made by the execution of the predetermined etching process. After that, a stumper disc is formed in accordance with the optically recording medium disc 40. Then, a large number of optically recording mediums 10 according to the present invention are manufactured in accordance with the known replication process.

Next, the cutting process for the optically recording medium disc 40 carried out by the apparatus 50 for manu-facturing the optically recording medium in this embodiment will be described below with reference to a flowchart shown in FIG. 6. By the way, this process is carried out under the management of the controller 33 in accordance with a control program recorded in a memory (not shown).

Figure 6:
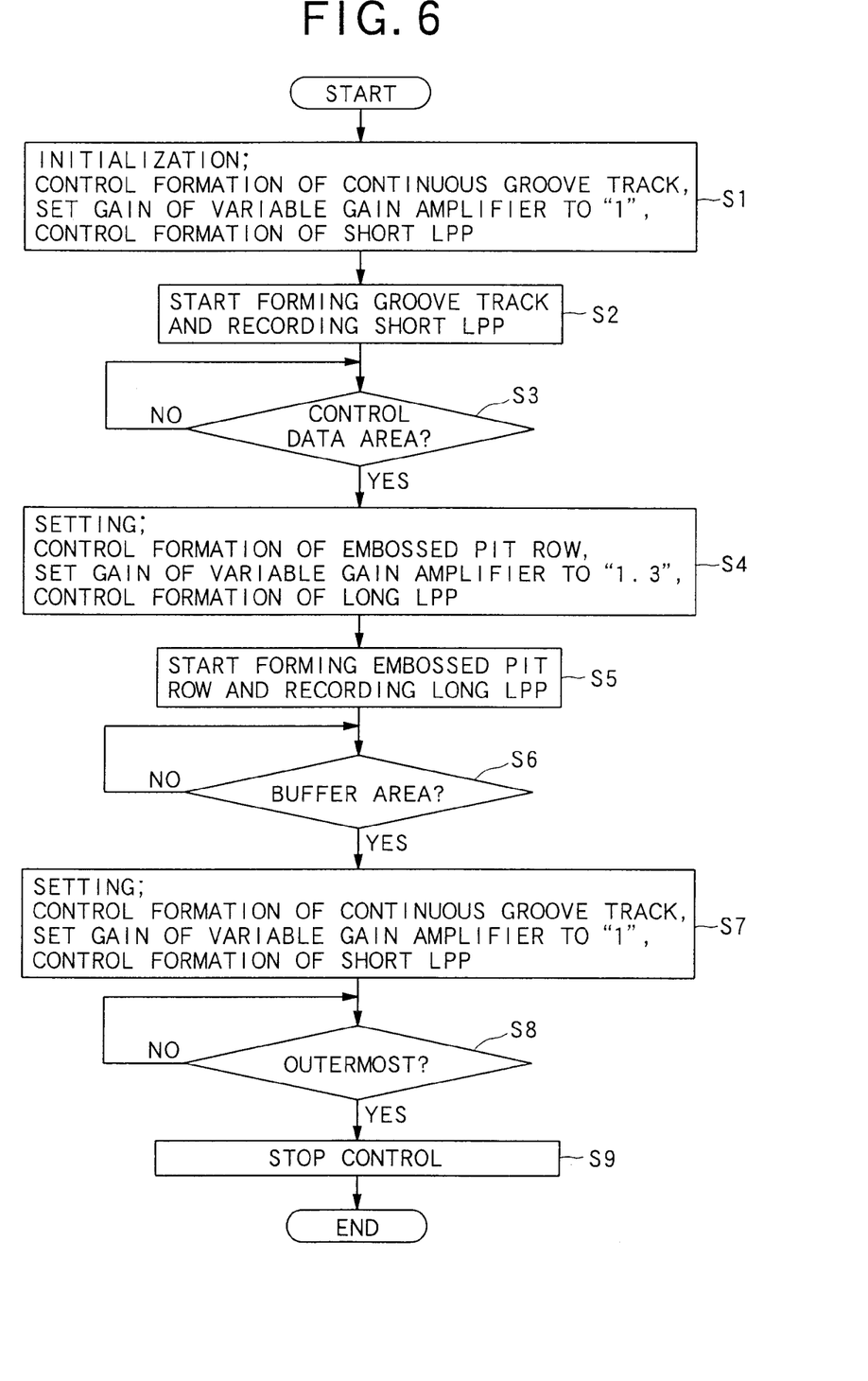
FIG. 6 is a flowchart used to describe a process of cutting an original disc of the optically recording medium, in the embodiments.

As shown in FIG. 6, the controller 33 of the apparatus 50 for manufacturing the optically recording medium according to this embodiment sets the groove data generator 34 to a continuous groove mode as an initialization setting at a step S1. In short, the controller 33 sets it at a state in which the switch 37 is fixed to an "a" side. Also, the controller 33 sets the gain of the variable gain amplifier 36 to "1" time, and also outputs the parallel data corresponding to the short LPP to the land data generator 20. Then, at the step S2, the controller 33 starts forming the groove track and recording the short LPP.

Then, at a step S3, the controller 33 always monitors whether or not a region currently being recorded becomes the control data area. If it is judged that the region currently being recorded becomes the control data area (step S3: YES), the operational flow proceeds to a step S4. At the step S4, the controller 33 instructs the groove data generator 34 to generate the zero data, which has been 8–16 modulated, as the groove data, and output it as the control signal to the switch 37. Also, the controller 33 sets the gain of the variable gain amplifier 36 to "1.3" times, and also controls the waveform shaping circuit 23 so that the pulse width is wider than the short LPP at the initial setting.

By the way, the reason why the gain of the variable gain amplifier 36 is increased is that, when the reproducing apparatus reproduces the second region on which the embossed pit row 19 is formed, a level of a push-pull signal containing the wobbling signal is dropped, which results in a problem of an interference with a servo operation of the reproducing apparatus. As the countermeasure, the gain of the variable gain amplifier 36 is increased, and the embossed pit row 19 is formed at the wobbling amplitude larger than the wobbling amplitude of the groove track 11.

Then, at a step S5, the controller 33 starts forming the embossed pit row 19 and recording the long LPP.

Then, at the step S6, the controller 33 always monitors whether or not the region currently being recorded becomes the buffer area. If the region currently being recorded becomes the buffer area (step S6: YES), the operational flow proceeds to a step S7. At the step S7, the controller 33 returns the settings to the initial settings done at the step Si, and the operational flow proceeds to a step S8.

At the step S8, the controller 33 always monitors whether or not the region currently being recorded becomes the outermost portion. If the region currently being recorded becomes the outermost portion (step S8: YES), the controller 33 carries out a stop control, to thereby stop the above-mentioned series of cutting operations.

Figure 7A:
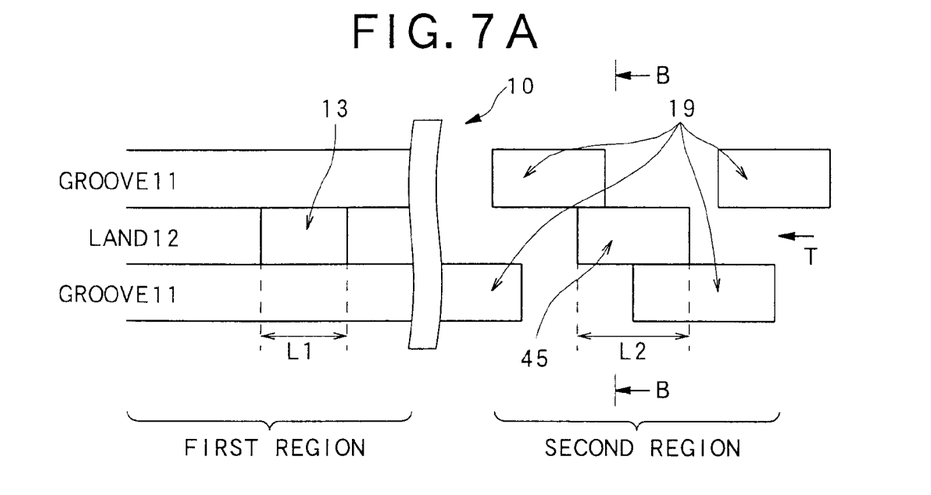
FIGS. 7A, 7B and 7C are diagrams schematically showing a groove track and a land pre-pit in a control data section in a first embodiment of the present invention.
Figure 7B:
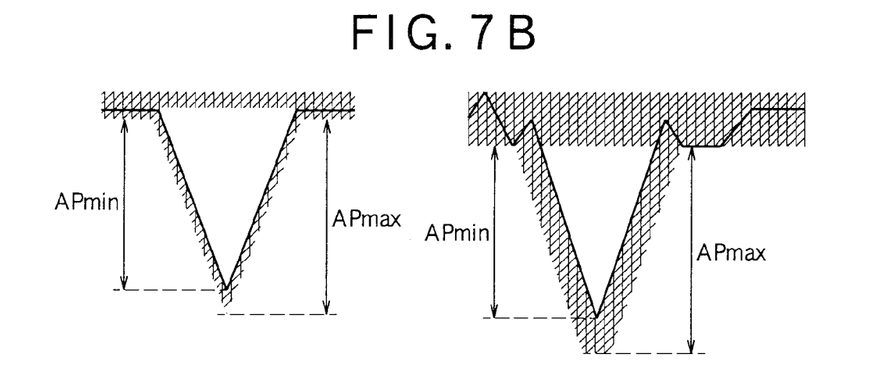

Next, the configuration of the optically recording medium 10 manufactured by using the optically recording medium disc 40 cut by process in the apparatus 50 for manufacturing the optically recording medium as mentioned above will be described below with reference to FIGS. 7A, 7B and 7C. By the way, FIG. 7A is an enlarged view showing the main portion of the optically recording medium 10, and it grammatically shows the shapes of the groove track 11 and the pre-pit 12 in the first region serving as the data area, and the shapes of the embossed pit row 19 and a pre-pit 45 in the second region serving as the control data area. FIG. 7B shows a pre-pit detection signal. And, FIG. 7C is a sectional view taking on the line B—B in FIG. 7A.

In the first region of the optically recording medium 10, the continuous groove tracks 11 are formed. The pre-pit 13 whose length in a scanning direction (indicated by an arrow T in FIG. 7A) is L1 is formed on the land track 12 arranged between the groove tracks 11. This length L1 of the pre-pit 13 is determined so as not to exert the bad influence on the reproduction signal of the groove track 11.

On the other hand, in the second region, the embossed pit rows 19 each having a depth Ed (e.g., 30 nm) are formed at positions corresponding to the groove tracks 11. The pre-pit 45 having a length L2 (L2>L1) is formed on the land track 12 arranged between the embossed pit rows 19.

Figure 7C:
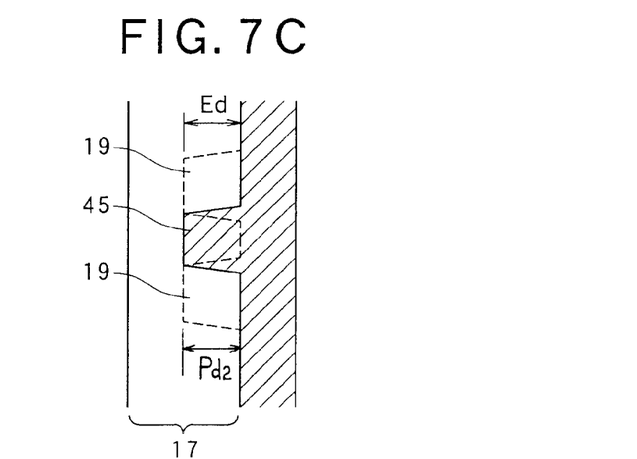

According to this optically recording medium 10, the depth Pd2 of the pre-pit 45 in the second region is equal to the depth Ed (e.g., 30 nm) of the embossed pit row 19, as shown in FIG. 7C. Also, the depth Pd1 of the pre-pit 13 in the first region is also equal to the depth Ed (e.g., 30 nm) of the embossed pit row 19. In short, according to the this optically recording medium 10, the pre-pit 45 formed in the second region differs from the pre-pit 13 formed in the first region, only in its length.

According to this optically recording medium 10, when the light spot is located at a position at which it covers the pre-pit 45 and the embossed pit row 19, the changes in the signals of the light reception elements A, B, C and D caused by the diffraction of the light become large. In short, the output signals of the light reception elements A and D become smaller, and the output signals of the light reception elements B and C become larger. Thus, the amplitude of the pre-pit detection signal in the second region is larger than that of the comparison example shown on the right side of FIG. 10B, as shown in the wave form view on the right side of FIG. 7B. Consequently, the ratio of APmin with respect to APmax becomes large, which can satisfy the value of the aperture ratio ARe (i.e., ARe>30%) defined by the DVD-RW format. By the way, associated with the fact that the length L2 of the pre-pit 45 is longer, the influence caused by the pre-pit 45 is induced in the reproduction signal to the embossed pit row 19. However, this has little or no problem since the reproduction signal with respect to the embossed pit row 19 exists as the noise impeding the operation for reading out the data overwritten on the embossed pit row 19.

Figure 8A:
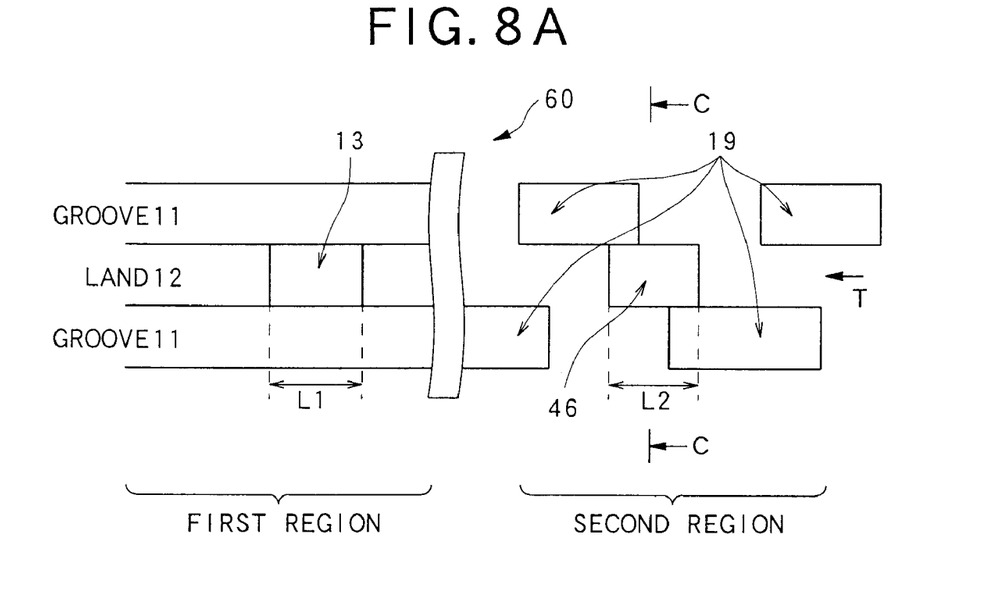
FIGS. 8A and 8B are diagrams schematically showing a groove track and a land pre-pit of a control data section in a second embodiment of the present invention.
Figure 8B:
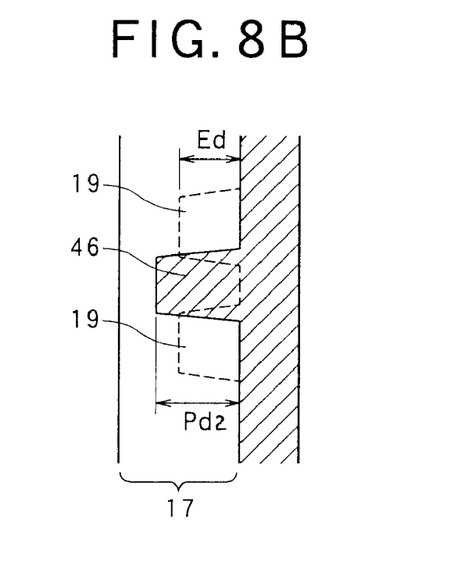

Next, an optically recording medium 60 according to a second embodiment of the present invention will be described below with reference to FIGS. 8A and 8B. FIG. 8A is an enlarged view showing the main portion of the optically recording medium 60, and diagrammatically shows the shapes of the groove track 11 and the pre-pit 13 in the first region and the shapes of the embossed pit row 19 and a pre-pit 46 in the second region. FIG. 8B is a partially sectional view of the optically recording medium 60.

According to this optically recording medium 60, in the first region, the continuous groove tracks 11 are formed as shown in FIG. 8A, and the pre-pit 13 having the length L1 and the depth Pd1 (e.g., 30 nm) are formed on the land track 12.

On the other hand, in the second region, the embossed pit row 19 having the depth Ed (e.g., 30 nm) is formed, and the pre-pit 46 having the same length L2 as the pre-pit 13 and the depth Pd2 (e.g., 40 nm) is formed on the land track 12.

According to this optically recording medium 60, the depth Pd1 (e.g., 30 nm) of the pre-pit 13 in the first region is shallower than the depth Pd2 (e.g., 40 nm) of the pre-pit 46 in the second region. Thus, similarly to the first embodiment, when the light spot is located at a position covering the pre-pit 46 and the embossed pit row 19, the changes in the signals of the light reception elements A, B, C and D caused by the diffraction of the light become large. In short, the output signals of the light reception elements A and D become smaller, and the output signals of the light reception elements B and C become larger. Hence, the pre-pit detection signal in the second region is largely changed toward the minus side. So, the ratio of APmin with respect to APmax becomes large, which can satisfy the value of the aperture ratio ARe (i.e., ARe>30%) defined by the DVD-RW format.

Figure 9:
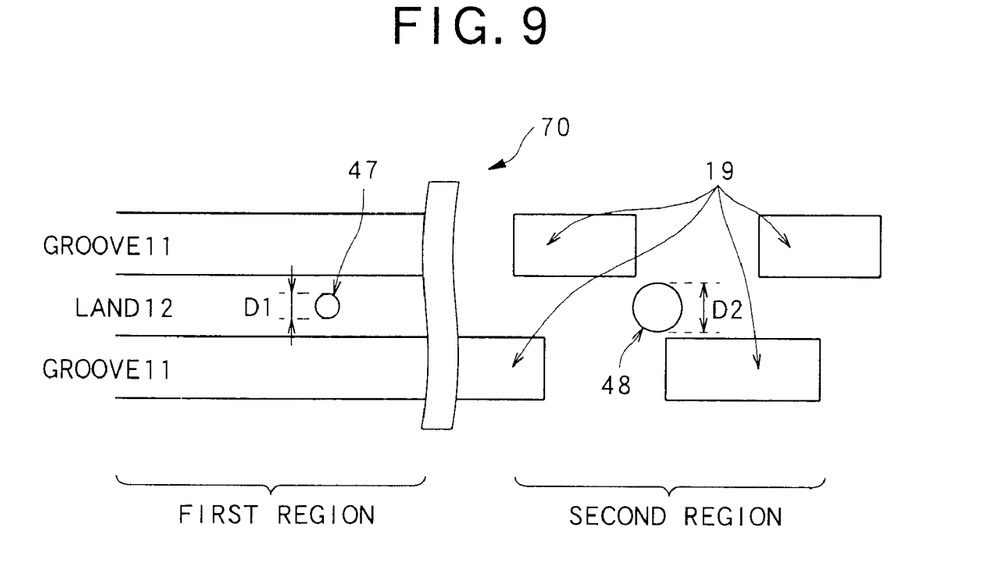
FIG. 9 is a diagram schematically showing a groove track and a land pre-pit of a control data section in a third embodiment of the present invention.

Next, an optically recording medium 70 according to a third embodiment of the present invention will be described below with reference to FIG. 9. FIG. 9 is an enlarged view showing the main portion of the optically recording medium 70.

According to the optically recording medium 70, in the first region, the continuous groove tracks 11 are formed and a circular pre-pit 47 having a diameter D1 is formed on the land track 12 as shown in FIG. 9 On the other hand, in the second region, the embossed pit rows 19 are formed, and a circular pre-pit 48 having a diameter D2 (D2>D1) is formed on the land track 12.

According to this optically recording medium 70, the pre-pit 48 in the second region is formed larger than the pre-pit 47 in the first region, in the radius direction of the optically recording medium 70. Thus, similarly to the first embodiment, the changes in the signals of the light reception elements A, B, C and D caused by the diffraction of the light become large In short, the output signals of the light reception elements A and D become smaller, and the output signals of the light reception elements B and C become larger. Hence, the pre-pit detection signal in the second region is largely changed toward the minus side. So, the ratio of APmin to APmax becomes large, which can satisfy the value of the aperture ratio ARe (i.e., ARe>30%) defined by the DVD-RW format.

As mentioned above, according to the third embodiment, the shape of the pre-pit formed in the second region is formed so as to obtain the larger amplitude of the pre-pit detection signal. Thus, this can satisfy the value of the aperture ratio ARe (i.e., ARe>30%) required by the DVD-RW format.

By the way, the present invention is not limited to the above-mentioned respective embodiments. Various variations may be embodied. For example, according to the first embodiment, only the length of the pre-pit in the second region is longer than that of the pre-pit in the first region. However, as illustrated in the second embodiment, at the same time, its depth of the pre-pit in the second region may be deeper than that in the first embodiment.

Also, the optically recording medium according to the embodiment of the present invention is the DVD-RW disc. However, the present invention can be applied to various recording media, such as an application to DVD-R serving as a write-once-type recording medium and the like.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No.2000-279280 filed on Sep. 14, 2000 including the specification, claims, drawings and summary is incorporated herein by reference in its entirety.

What is claimed is:

1. An optically recording medium on which record information can be optically recorded, comprising:
    a substrate;
    a record surface formed on said substrate and having a first region where the record information is to be recorded and second region where predetermined data to control recording and/or reproducing the record information is recorded;
    groove tracks formed in the first region and the second region, on which the record information is to be recorded in the first region and on which the predetermined data is recorded as an embossed pit row in the second region so as to prevent another data overwritten on the embossed pit row from being read out;
    a land track formed in the first region and the second region between said groove tracks adjacent to each other; and
    pre-pits arranged on said land track in the first region and the second region and including address information, which indicates a record position on said groove track, the pre-pit in the second region being formed in a shape different from that in the first region such that a larger amplitude of a pre-pit detection signal corresponding to the pre-pit is obtained in the second region as compared with an arrangement in which a pre-pit in the second region is formed having the same shape as a pre-pit in the first region, so that an aperture ratio of a pre-pit detection signal for the pre-pit in the second region is greater than 30%.

2. An optically recording medium according to claim 1, wherein the pre-pit in the first region is formed so as to minimize an influence of the pre-pit on a reproduction signal corresponding to the record information read out from said groove tracks.

3. An optically recording medium according to claim 1, wherein the pre-pit in the second region is formed longer in a scanning direction than the pre-pit in the first region.

4. An optically recording medium according to claim 1, wherein the pre-pit in the second region is formed deeper than the pre-pit in the first region.

5. An optically recording medium according to claim 1, wherein the pre-pit in the second region is formed larger in a disc radial direction than the pre-pit in the first region.

6. An optically recording medium according to claim 1, wherein the second region is located at an address same as that of a region where reproduction control information of a recording medium dedicated to a reproduction is recorded.

7. An apparatus for manufacturing an optically recording medium, on which record information can be optically recorded, by using an original disc, comprising:
    a groove track forming device for forming groove tracks on a surface of said original disc, on which the record information is to be recorded in a first region and on which predetermined data to control recording and/or reproducing the record information is recorded as an embossed pit row in a second region, so as to prevent another data overwritten on the embossed pit row from being read out; and
    a pre-pit forming device for forming pre-pits arranged on a land track between said groove tracks adjacent to each other in the first region and the second region and including address information, which indicates a record position on said groove track,
    said pre-pit forming device forming the pre-pit in the second region in a shape different from that in the first region such that a larger amplitude of a pre-pit detection signal corresponding to the pre-pit is obtained in the second region as compared with an arrangement in which a pre-pit in the second region is formed having the same shape as a pre-pit in the first region, so that an aperture ratio of a pre-pit detection signal for the pre-pit in the second region is greater than 30%.

8. A manufacturing apparatus to claim 7, wherein said pre-pit forming device forms the pre-pit in the first region so as to minimize an influence of the pre-pit on a reproduction signal corresponding to the record information read out from said groove tracks.

9. A manufacturing apparatus according to claim 7, wherein said pre-pit forming device forms the pre-pit in the second region longer in a scanning direction than the pre-pit in the first region.

10. A manufacturing apparatus according to claim 7, wherein said pre-pit forming device forms the pre-pit in the second region deeper than the pre-pit in the first region.

11. A manufacturing apparatus according to claim 7, wherein said pre-pit forming device forms the pre-pit in the second region larger in a disc radial direction than the pre-pit in the first region.

12. A manufacturing apparatus according to claim 7, wherein the second region is located at an address same as that of a region where reproduction control information of a recording medium dedicated to a reproduction is recorded.

13. A method of manufacturing an optically recording medium, on which record information can be optically recorded, by using an original disc, comprising:

a groove track forming process of forming groove tracks on a surface of said original disc, on which the record information is to be recorded in a first region and on which predetermined data to control recording and/or reproducing the record information is recorded as an embossed pit row in a second region, so as to prevent another data overwritten on the embossed pit row from being read out; and a pre-pit forming process of forming pre-pits arranged on a land track between said groove tracks adjacent to each other in the first region and the second region and including address information, which indicates a record position on said groove track, said pre-pit forming process forming the pre-pit in the second region in a shape different from that in the first region such that a larger amplitude of a pre-pit detection signal corresponding to the pre-pit is obtained in the second region as compared with an arrangement in which a pre-pit in the second region is formed having the same shape as a pre-pit in the first region, so that an aperture ratio of a pre-pit detection signal for the pre-pit in the second region is greater than 30%.

14. A manufacturing method according to claim 13, wherein said pre-pit forming process forms the pre-pit in the first region so as to minimize an influence of the pre-pit on a reproduction signal corresponding to the record information read out from said groove tracks.

15. A manufacturing method according to claim 13, wherein said pre-pit forming process forms the pre-pit in the second region longer in a scanning direction than the pre-pit in the first region.

16. A manufacturing method according to claim 13, wherein said pre-pit forming process forms the pre-pit in the second region deeper than the pre-pit in the first region.

17. A manufacturing method according to claim 13, wherein said pre-pit forming process forms the pre-pit in the second region larger in a disc radial direction than the pre-pit in the first region.

18. A manufacturing method according to claim 13, wherein the second region is located at an address same as that of a region where reproduction control information of a recording medium dedicated to a reproduction is recorded.

* * * * *